United States Patent
Bos et al.

(10) Patent No.: US 9,528,824 B2
(45) Date of Patent: Dec. 27, 2016

(54) TACTILE PROBING SYSTEM

(71) Applicant: MITUTOYO CORPORATION, Kanagawa (JP)

(72) Inventors: Edwin Bos, Dommelen (NL); Ernst Treffers, Dommelen (NL); Kazuhiko Hidaka, Tokyo (JP)

(73) Assignee: MITUTOYO CORPORATION, Kanagawa (JP)

( * ) Notice: Subject to any disclaimer, the term of this patent is extended or adjusted under 35 U.S.C. 154(b) by 115 days.

(21) Appl. No.: 14/674,397

(22) Filed: Mar. 31, 2015

(65) Prior Publication Data

US 2016/0290797 A1    Oct. 6, 2016

(51) Int. Cl.
| | |
|---|---|
| *G01B 5/012* | (2006.01) |
| *G01B 21/04* | (2006.01) |
| *G01B 7/00* | (2006.01) |
| *G01B 7/012* | (2006.01) |

(52) U.S. Cl.
CPC .............. *G01B 21/04* (2013.01); *G01B 7/001* (2013.01); *G01B 7/012* (2013.01)

(58) Field of Classification Search
CPC .......... G01B 21/04; G01B 7/001; G01B 7/012
USPC .......................................................... 33/503
See application file for complete search history.

(56) References Cited

U.S. PATENT DOCUMENTS

| | | | | |
|---|---|---|---|---|
| 4,451,988 A | * | 6/1984 | McMurtry | G01B 7/012 33/561 |
| 4,513,507 A | * | 4/1985 | Laskowski | G01B 7/012 33/503 |
| 4,574,199 A | * | 3/1986 | Pryor | G01B 11/007 250/559.33 |
| 4,833,792 A | * | 5/1989 | Aehnelt | G01B 7/012 33/558 |
| 5,146,691 A | * | 9/1992 | McMurtry | G01B 5/012 33/558 |

(Continued)

FOREIGN PATENT DOCUMENTS

| | | |
|---|---|---|
| NL | 1010894 | 6/2000 |
| NL | 1010894 C2 | 6/2000 |

OTHER PUBLICATIONS

U.S. Appl. No. 14/273,980 to Matthias Briegel et al., filed May 9, 2014.

(Continued)

*Primary Examiner* — G. Bradley Bennett
(74) *Attorney, Agent, or Firm* — Greenblum & Bernstein, P.L.C.

(57) ABSTRACT

A contact probe includes a stylus, a sensor, and two parallel substantially planar plates. The stylus has a contact. The sensor has a substantially planar shape and includes a fixed portion, at least three thin-walled portions each formed of a planar plate and having a strain sensor vapor-deposited thereon, and a movable portion to which the stylus is mounted and linked to the fixed portion via the thin-walled portions in at least three locations. The two parallel substantially planar plates are connected to the fixed portion on opposing sides and sandwich the movable portion so as to maintain a predetermined distance between the movable portion and the two parallel substantially planar plates and limit movement of the movable portion to a movable range. The sensor outputs a contact signal due to the strain sensors deforming in response to a measurement force from the stylus.

13 Claims, 28 Drawing Sheets

(56) References Cited

U.S. PATENT DOCUMENTS

| | | | | |
|---|---|---|---|---|
| 5,345,690 A | * | 9/1994 | McMurtry | G01B 5/012 33/558 |
| 5,755,038 A | | 5/1998 | McMurtry | |
| 5,756,886 A | * | 5/1998 | Nishimura | G01B 7/016 33/558 |
| 5,887,356 A | * | 3/1999 | Sheldon | G01B 7/012 33/556 |
| 6,360,176 B1 | * | 3/2002 | Nishioki | G01B 7/012 702/113 |
| 7,124,514 B2 | * | 10/2006 | McMurtry | G01B 7/012 33/556 |
| 2001/0054237 A1 | * | 12/2001 | Hidaka | G01B 7/012 33/561 |
| 2004/0118000 A1 | | 6/2004 | Roth et al. | |
| 2005/0263727 A1 | * | 12/2005 | Noda | G01B 5/008 250/559.29 |
| 2006/0010702 A1 | | 1/2006 | Roth et al. | |
| 2007/0180722 A1 | | 8/2007 | Seitz et al. | |
| 2008/0163507 A1 | | 7/2008 | Hellier et al. | |
| 2009/0265946 A1 | * | 10/2009 | Jordil | G01B 7/012 33/503 |
| 2016/0109217 A1 | * | 4/2016 | Fujihara | G01B 11/005 33/503 |
| 2016/0169656 A1 | * | 6/2016 | Padovani | G01B 21/047 33/503 |
| 2016/0299028 A1 | * | 10/2016 | Arai | G01L 25/00 |

OTHER PUBLICATIONS

Search Report issued by European Patent Office (EPO) patent office in EPO Patent Application No. 16153752.7, dated Aug. 3, 2016.

* cited by examiner

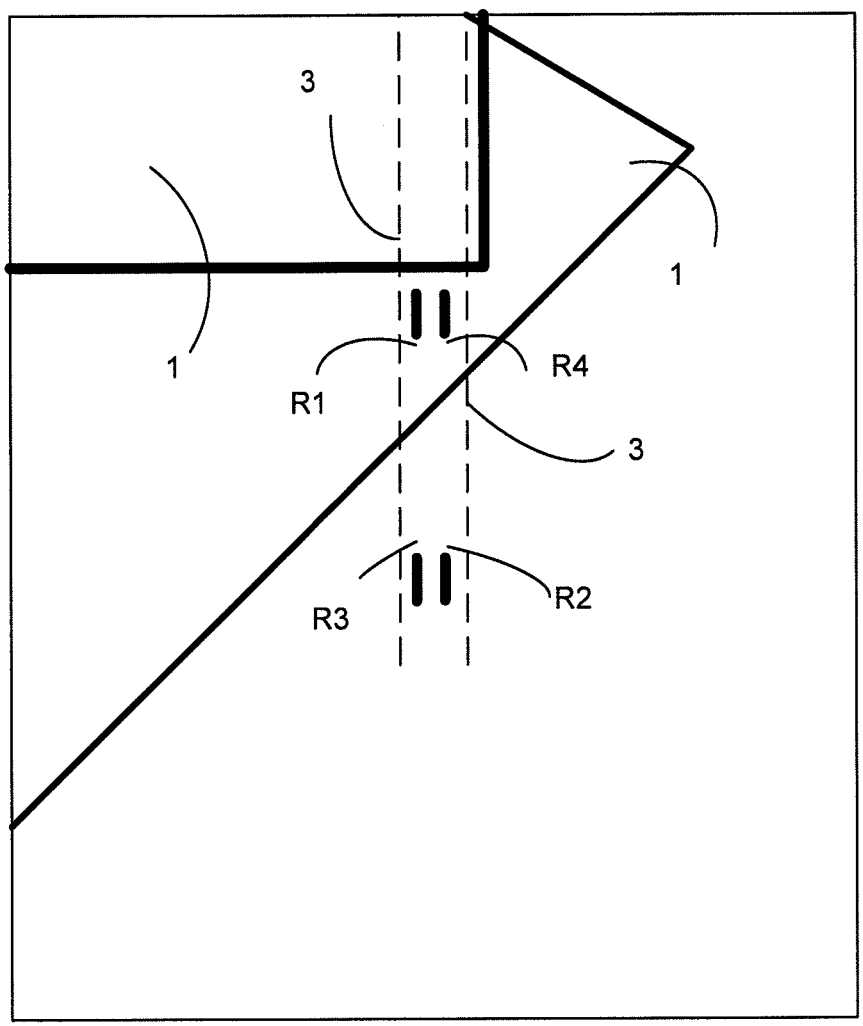

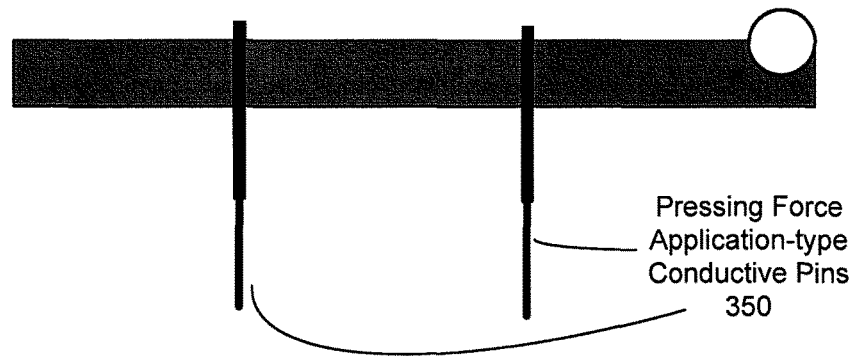
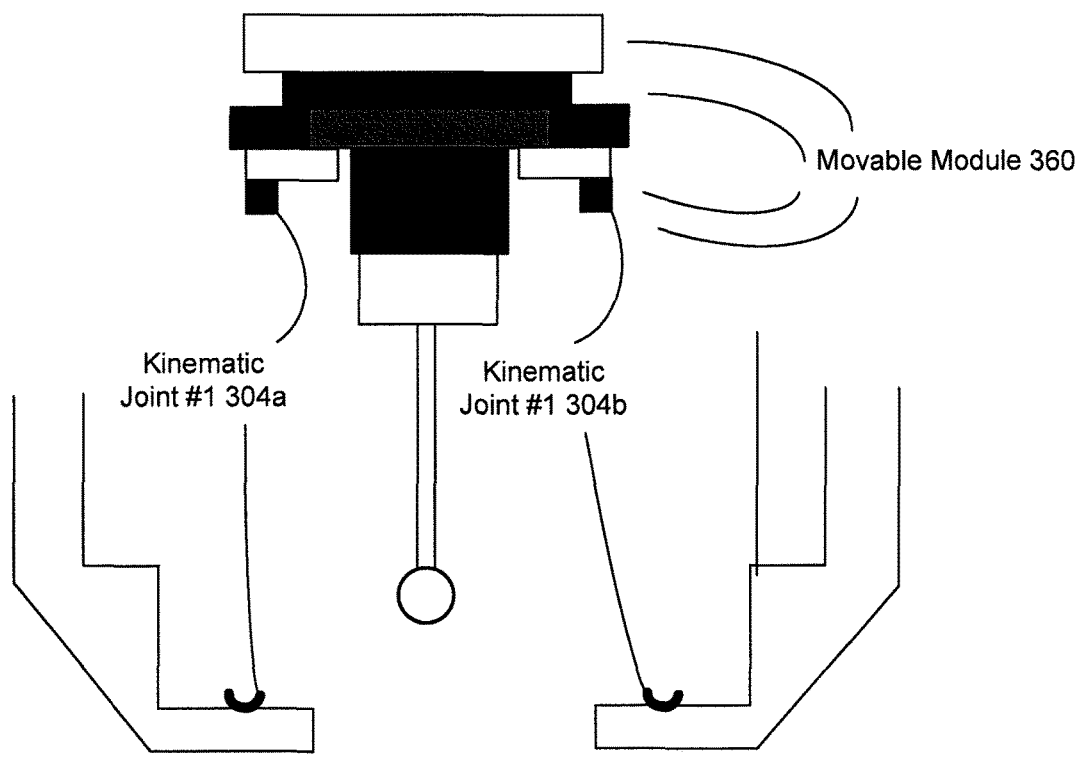

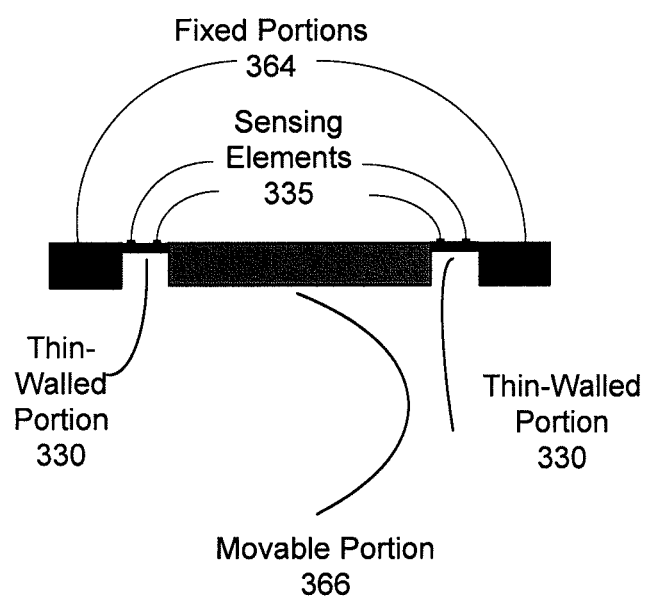
Figure 3d1a
Side View

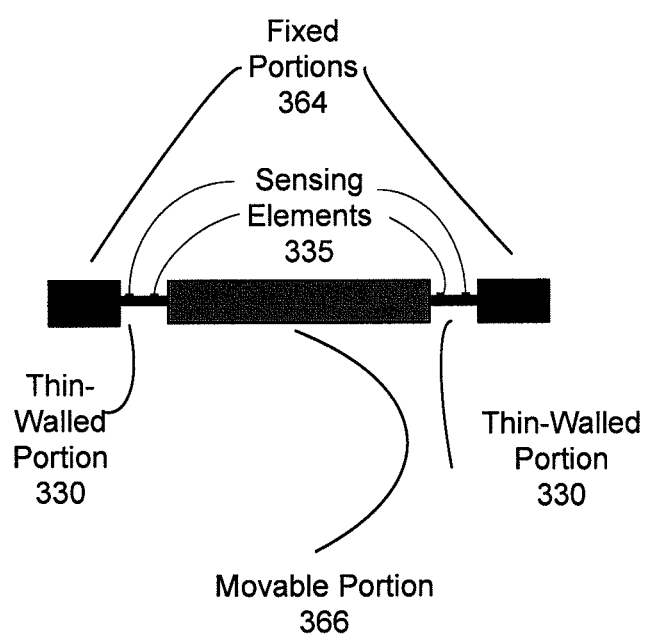
Figure 3d1b
Side View

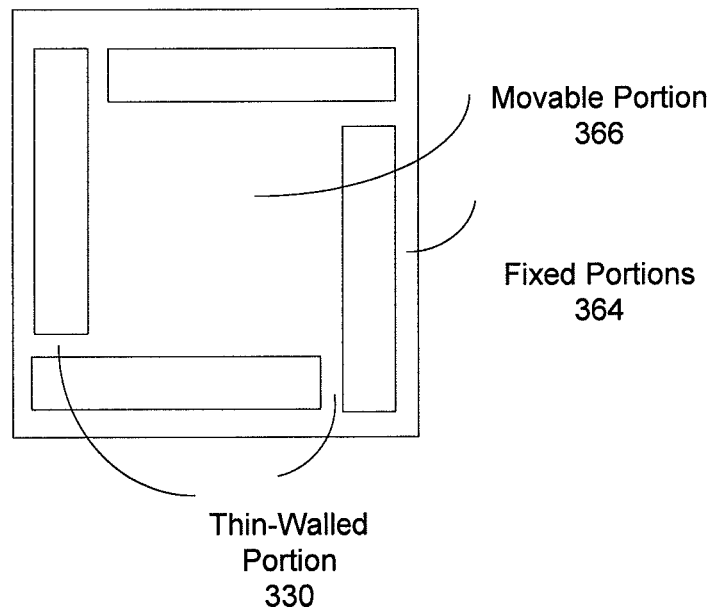
Figure 3d2a

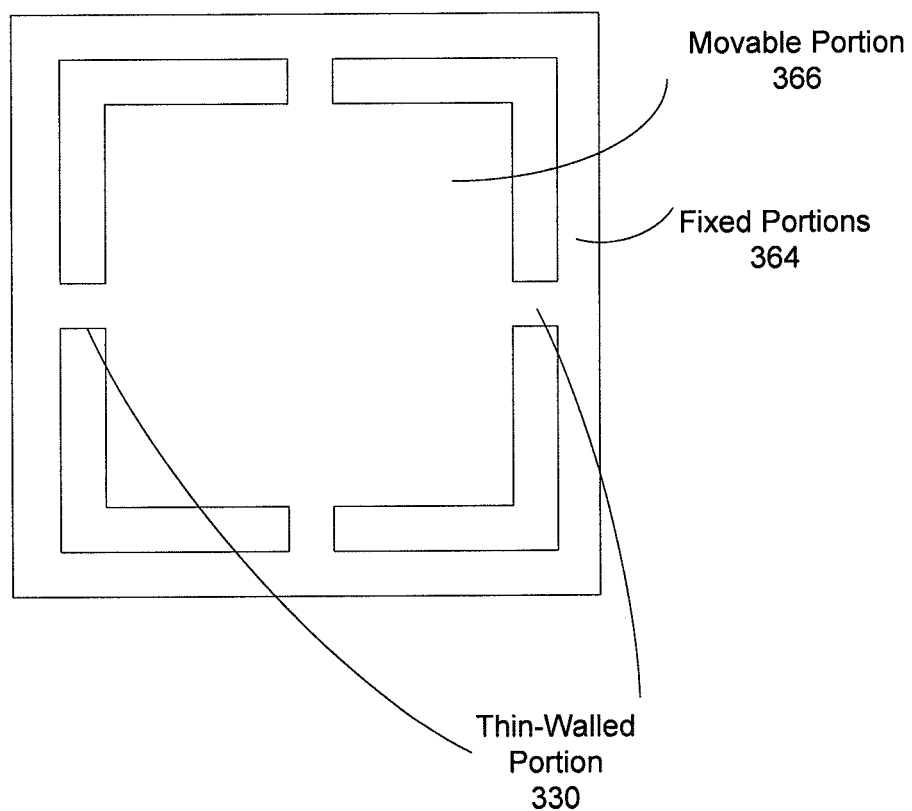
Figure 3d2b

Figure 3d3
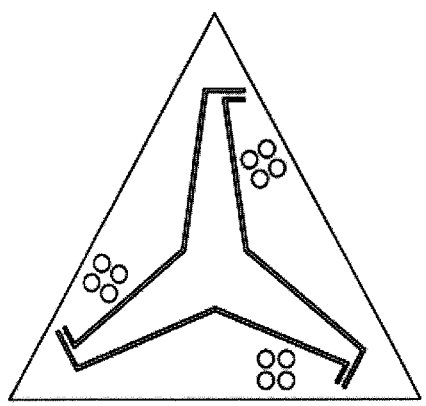
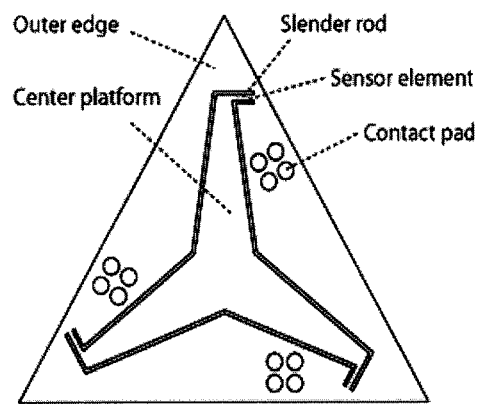

Figure 3d4
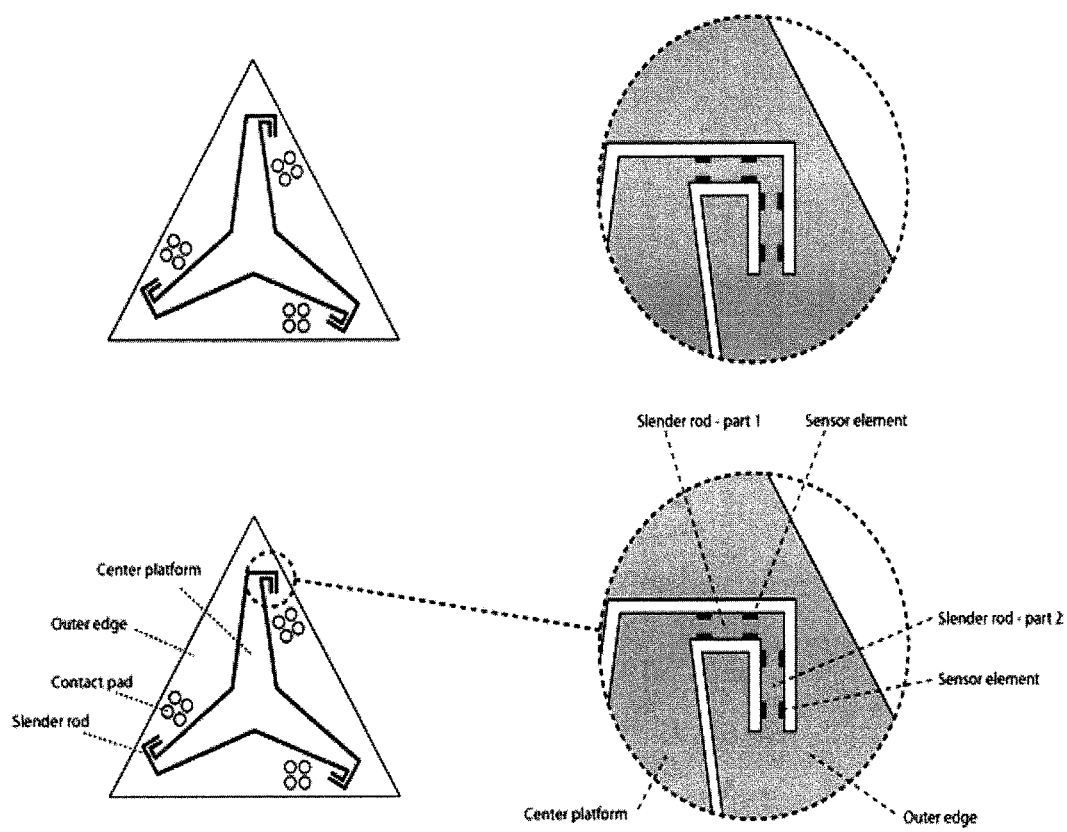

Figure 3d5
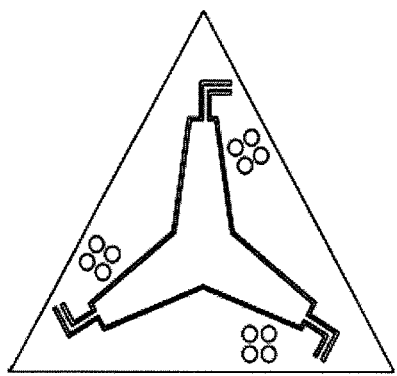 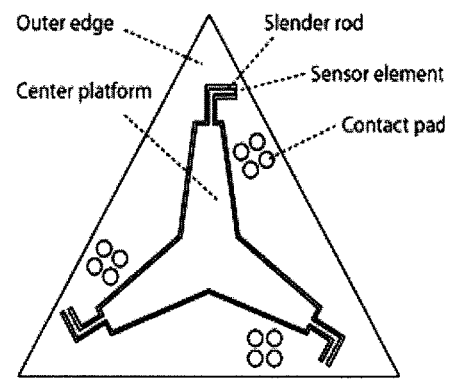

Figure 3d6
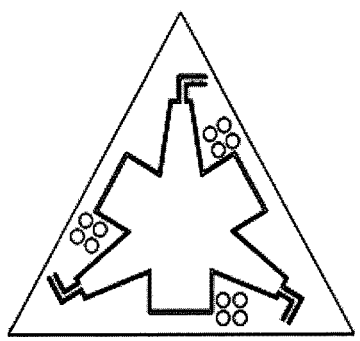
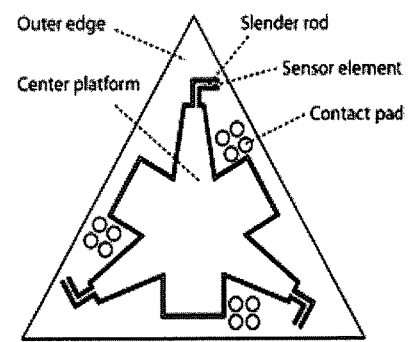

Figure 3d7
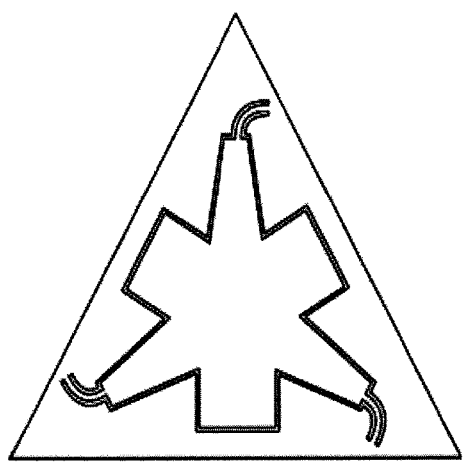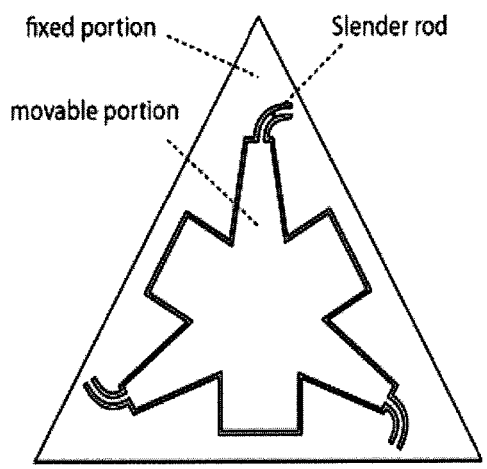

Figure 3e1
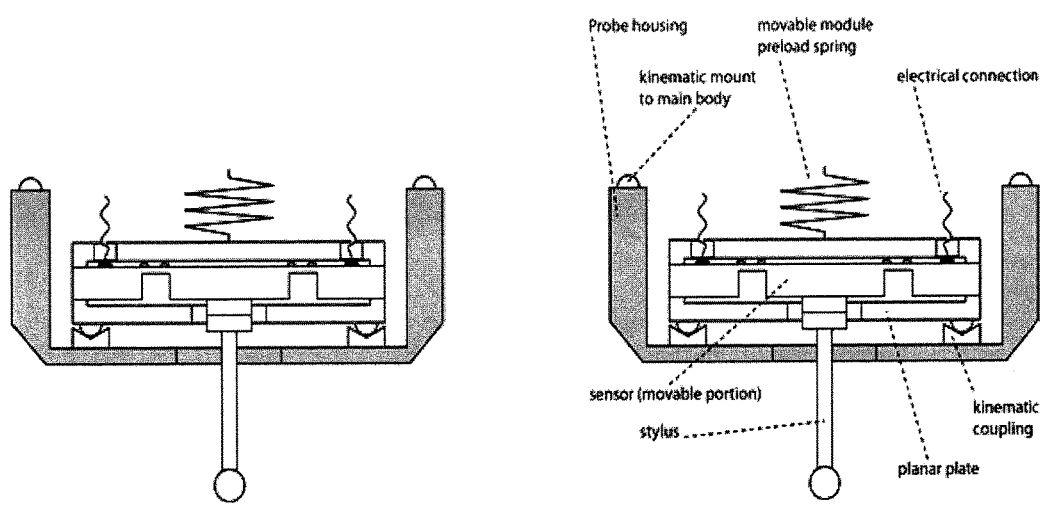

Figure 3e2
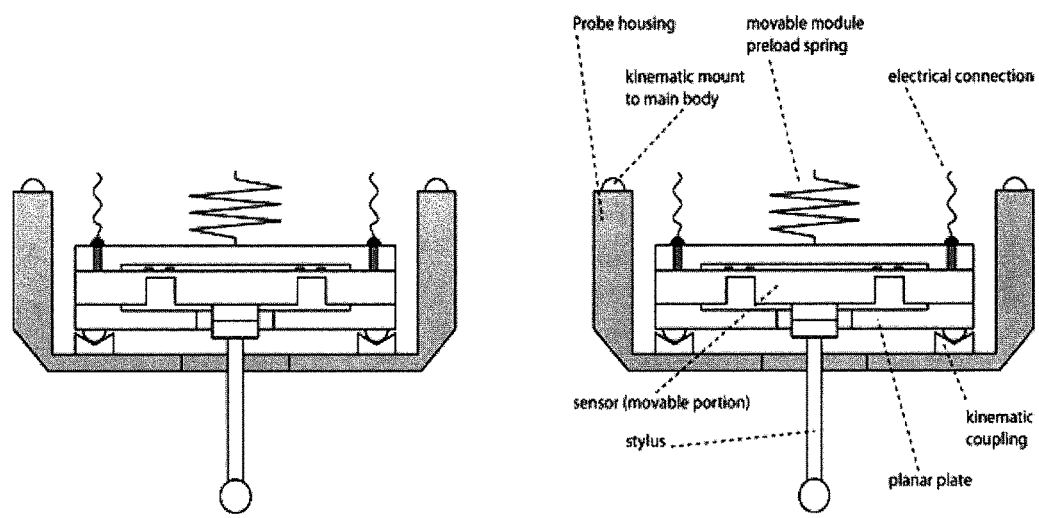

Figure 3e3
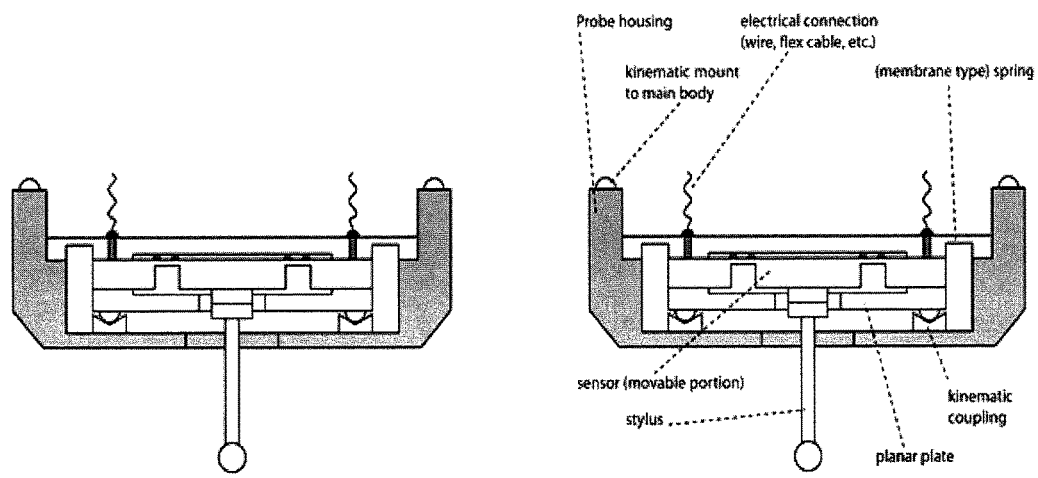

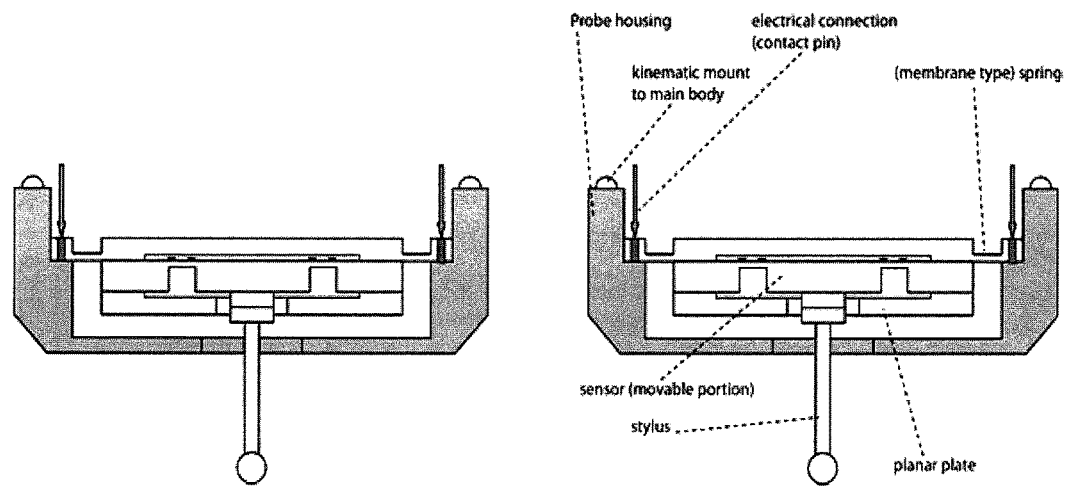
Figure 3e4

$F = z \cdot x$ $z = k_1 / (1 + \omega^2 c^2 k_1^2)^{0.5}$

Sensitivity z is proportional to the displacement x.

$F = (z + k_2) \cdot x$

Tandem connection of spring $k_2$ makes lower sensitivity and longer measuring range.
It makes possible to adjust sensitivity and measuring range by $k_2$.

TACTILE PROBING SYSTEM

BACKGROUND

1. Field of the Disclosure

The present disclosure relates to the field of tactile probing systems for use in and/or with coordinate-measuring machines that measure coordinates of a workpiece. More particularly, the present disclosure relates to a tactile probing system with an improved ability to tolerate excessive displacements.

2. Background Information

Contact probes are known to suffer, as a general matter, due to bending, or alternatively to torsion, tension, and compression. Such contact probes are known to include a sensor system and a stylus with a contact. The sensor system senses when the contact on the stylus contacts a workpiece. The sensor system may include strain gages mounted to thin-walled portions on one or more surfaces. Movable bodies connected to the contact on the stylus are supported by the thin-walled portions, so that displacement of the contact on the stylus is transmitted through to the strain gages mounted to the thin-walled portions. A signal is output when the strain gages are deformed based on displacement of the movable bodies that occurs when the contact on the stylus contacts the workpiece.

The movable bodies of the sensor may suffer from deformation or even breakage, such as when they are not constrained other than by the thin-walled portions and are subject to excessive displacement resulting from the contact on the stylus contacting a workpiece. That is, the thin-walled portions of the sensor have elasticity limits and may not be able to receive the excessive displacement transmitted via the movable bodies. The problem of excessive displacement being transmitted through relatively-unconstrained movable bodies is made worse when the thin-walled portions that receive the excessive displacement are mounted on different surfaces instead of a single common surface.

A stopper may be provided to constrain displacement of the movable bodies, such that when displacement occurs the thin-walled portions do not exceed the elasticity limit. Alternatively, a kinematic connection may be provided to allow a stylus to separate from the sensor if the stylus is placed under excessive displacement. However, even using singular known mechanisms such as stoppers or kinematic connections, contact probes are still known to suffer from bending, or torsion, tension, and compression.

The description of prior art FIGS. 1A, 1B, 1C and 1D as follows is drawn from the description in Netherlands Patent Application number NL 1010894. A conventional contact probe in NL 1010894 includes a probe 1 with which a measurement object is contacted, a probe housing which forms the connection with the coordinate-measuring machine, the bridge 3 which elastically connects the probe to the probe housing, and 4 the measuring system which measures the displacement of the probe in relation to the probe housing.

Noted components of the conventional contact probe are shown in a top view in FIG. 1A, as a cutout of details of FIG. 1A in FIG. 1B, as a circuit schematic of elements in FIG. 1C, and as a physical layout of elements in FIG. 1D.

The stylus and probe tip 4 is connected to the elastic bridge 3 by an intermediate body 5. In an original design prior to Netherlands Patent Application number NL 1010894, the stylus and probe tip 4 were connected to the intermediate body 5 and a moveable base 1 to form a central platform. The central platform of stylus and probe tip 4, intermediate body 5 and moveable base 1 are connected to three elastic rods 3, which guide the motion of the central platform.

In FIG. 1A, the stylus and probe tip 4 and the intermediate body 5 are relatively rigid so that the deformation of these components is small in relation to the deformation of the elastic bridge 3 so as to maintain measurement sensitivity. The elastic elements of the bridge 3 allow a translation in an out-of-plane direction and in rotations. These rotations result in a pseudo translation at the probe tip 4. The bridge 3 enables translation of the probe tip 4 in all directions in relation to a probe housing (not shown). The bridge 3 in FIGS. 1A, 1B, 1C and 1D consists of three elastic elements in FIG. 1A. The elastic elements of the bridge 3 are located in one plane, which eases manufacturing of the bridge 3 and the strain gauges R1, R2, R3 and R4 on the bridge using etching techniques. Each elongated elastic element 3 defines, in close approximation, solely the movement parallel to the longest side of the beam of the bridge 3.

The orientation and position of the intermediate body 5, and therefore the position of the probe tip 4, are read out by strain gauges R1, R2, R3, R4 on the elastic elements of the bridge 3 in such a way that at least all released degrees of freedom can be measured. A strain gauge R1, R2, R3, R4 is an electric or piezoelectric sensor which has an electrical resistance which is dependent on the mechanical strain in the area of the strain gauge R1, R2, R3, R4.

In the bridge 3, four strain gauges R1, R2, R3 and R4 are fitted to each elastic element of the bridge 3 according to FIG. 1B. The strain gauges R1, R2, R3 and R4 are then connected into a complete Wheatstone bridge according to FIG. 1C. Since the elongated elements of the bridge 3 will in most cases be bent into an S-shape, according to FIG. 1D, the change in resistance of the strain gauges R1 and R4 is opposed to the change in resistance of the strain gauges R2 and R3. It then suffices to have strain gauges R1, R2, R3, R4 on the upper side only, in order to simplify the etching process.

The displacement of the probe tip 4 is measured by means of four strain gauges R1, R2, R3, R4 on each beam of the bridge 3, as shown in FIGS. 1B, 1C, 1D. The change in the resistance of the strain gauges R1, R2, R3, R4 is measured in a Wheatstone bridge, as shown in FIG. 1C. Therefore, the conventional probing system can be implemented where displacements of the probe tip 4 can be measured in three orthogonal directions (3D).

As described, the movable bodies of the probe 1, elastic elements 3 and intermediate body 5 are not constrained, so an issue is created when the elastic elements 3 exceed an elasticity limit in response to the amount of displacement. Additionally, the movable bodies and the stylus are made integral using an adhesive or the like, but this then requires changing an entire sensor in order to change out the stylus.

BRIEF DESCRIPTION OF THE DRAWINGS

FIG. 1*b* shows elements of the conventional contact probe, according to an aspect of the present disclosure;

FIG. 3b shows elements of an exemplary tactile probing system, according to an aspect of the present disclosure;

FIG. 3d1a shows elements of an exemplary tactile probing system, according to an aspect of the present disclosure;

FIG. 3d1b shows elements of an exemplary tactile probing system, according to an aspect of the present disclosure;

FIG. 3d2a shows elements of an exemplary tactile probing system, according to an aspect of the present disclosure;

FIG. 3d2b shows elements of an exemplary tactile probing system, according to an aspect of the present disclosure;

FIG. 3d3 shows a configuration of a sensor, according to an aspect of the present disclosure;

FIG. 3d4 shows a configuration of a sensor, according to an aspect of the present disclosure;

FIG. 3d5 shows a configuration of a sensor, according to an aspect of the present disclosure;

FIG. 3d6 shows a configuration of a sensor, according to an aspect of the present disclosure;

FIG. 3d7 shows a configuration of a sensor, according to an aspect of the present disclosure;

FIG. 3e1 shows an exemplary tactile probing system, according to an aspect of the present disclosure;

FIG. 3e2 shows an exemplary tactile probing system, according to an aspect of the present disclosure;

FIG. 3e3 shows an exemplary tactile probing system, according to an aspect of the present disclosure;

FIG. 3e4 shows an exemplary tactile probing system, according to an aspect of the present disclosure;

FIG. 4 shows another a sequence of effects of an exemplary tactile probing system, according to an aspect of the present disclosure;

FIG. 5 shows another exemplary tactile probing system, according to an aspect of the present disclosure;

FIG. 6 shows another sequence of effects of an exemplary tactile probing system, according to an aspect of the present disclosure;

FIG. 7 shows another exemplary tactile probing system, according to an aspect of the present disclosure;

DETAILED DESCRIPTION

In view of the foregoing, the present disclosure, through one or more of its various aspects, embodiments and/or specific features or sub-components, is thus intended to bring out one or more of the advantages as specifically noted below.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an" or "the", is not to be construed as limiting the element to the singular.

As described herein, a tactile probing system can be used in a coordinate-measuring machine (CMM) with high precision. The design of the tactile probing system described herein includes several functional components.

Figure 2:
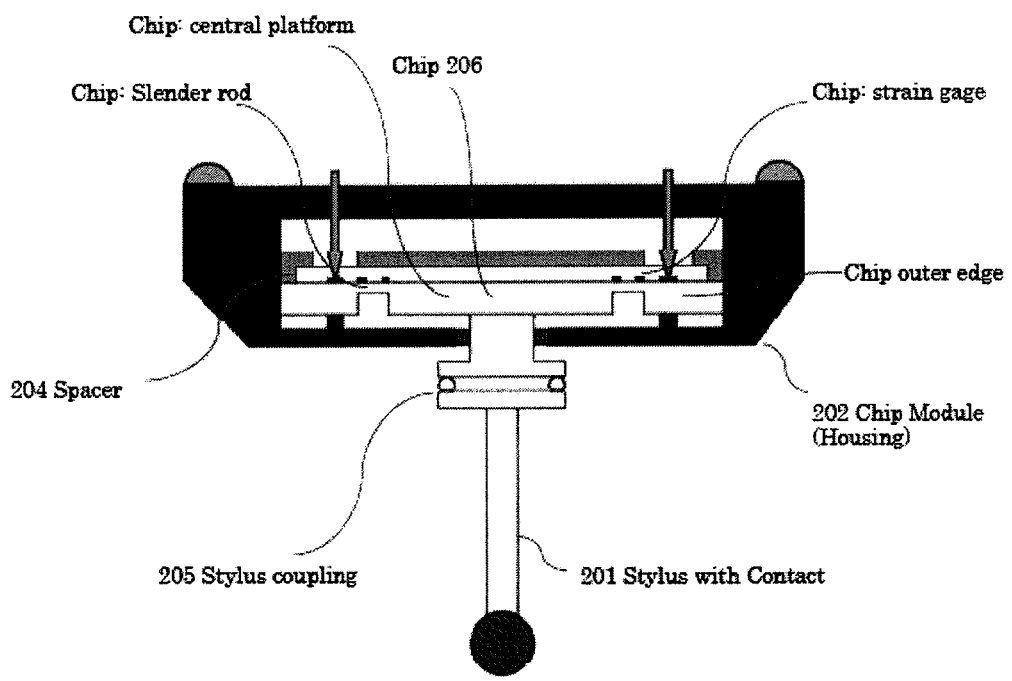
FIG. 2 shows an exemplary tactile probing system, according to an aspect of the present disclosure.

FIG. 2 shows a semi-mechanical chipstack for an exemplary tactile probing system. In FIG. 2, a chip 206 is fitted into a larger chip module (housing) 202. The chip 206 includes a central platform, slender rods (beams) and an outer edge. The chip 206 may be a silicon chip. The central platform of the chip 206 is connected to a stylus coupling 205. The outer edge of the chip 206 is connected to a chip module 202 (housing). The central platform and the outer edge of the chip 206 are connected via the slender rods (beams). In FIG. 2, piezo resistive strain gauges are shown above the slender rods (beams) of the chip 206.

In FIG. 2, a gap distance between the chip 206 and the separator plate above the chip 206 is accurately controlled using the spacer 204. The spacer 204 in FIG. 2 is representative of any mechanism to accurately control the gap between the chip 206 and the separator plate above the chip 206 during operation of the probe. Thus, a spacer can be a separate mechanical element such as glass spheres, a membrane, glue with a controlled thickness, or a combination of different elements. Further, a spacer 204 can be integrated into a chip 206 or separator plate above the chip 206 in the form of a protruding element with an accurately controlled height (e.g., a bump). In FIG. 2, the spacer between chip 206 and chip module 202 is integrated into the chip module 202, and the chip module 202 is therefore part of the chip stack in FIG. 2.

Also in FIG. 2, a stylus with contact 201 provided with a contact is coupled to the stylus coupling 205. The stylus coupling 205 may be magnetically coupled to the central platform of the chip 206.

FIGS. 3a, 3b, 3c and 3d show another exemplary tactile probing system, according to an aspect of the present disclosure. In FIGS. 3a, 3b, 3c and 3d, a stylus module 300 includes a stylus with contact 301, which is also coupled to a stylus coupling 305. A movable portion 340 is provided above the stylus coupling 305, and is movably sandwiched between two fixed portions 302a. Two kinematic joints #1 are provided between the chip module housing 302 and the fixed portions 302a so that the chip module housing 302 can separate from the fixed portions 302a when subject to excessive displacement forces. A kinematic joint #2 is provided at the top of the stylus module 300 so that the stylus module 300 can separate from another object to which it is attached when subject to excessive displacement forces.

Figure 3A:
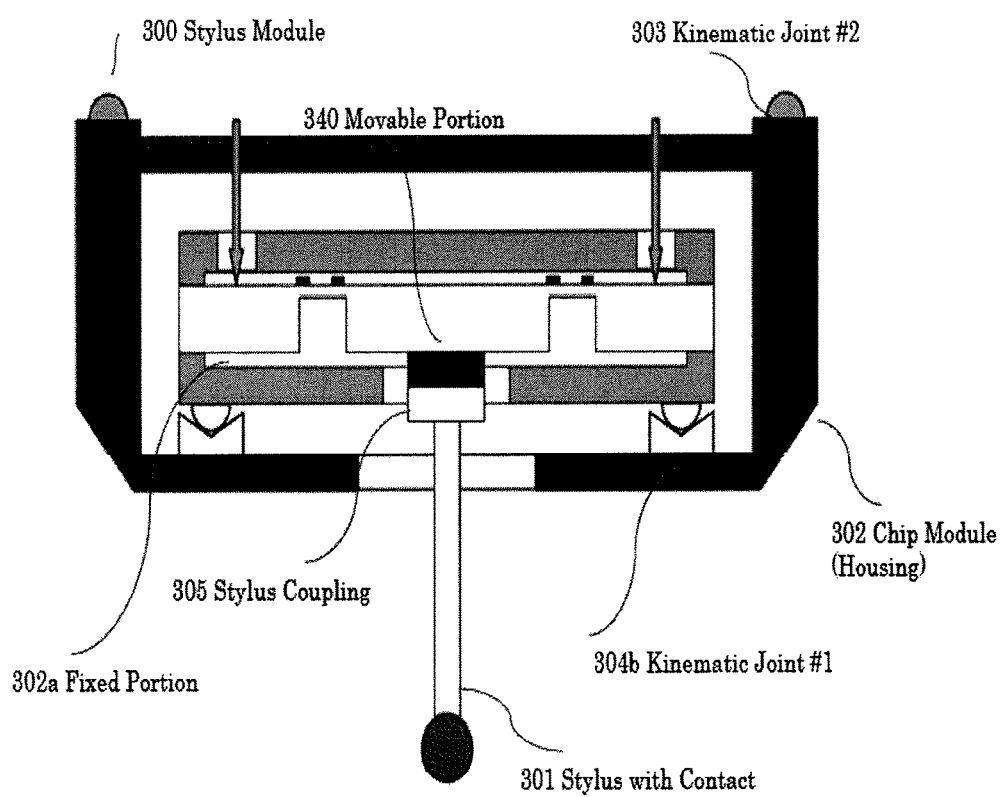
FIG. 3a shows another exemplary tactile probing system, according to an aspect of the present disclosure.

As can be seen in FIG. 3a, several mechanisms make it possible to progressively resolve an excess amount of pressure on a stylus contact. In this regard, the movable portion 340 is first able to move within a movable range both between fixed portions 302a on the sides, but also between a single plate above and a single plate with a hole below. Multiple plates can be used in a more complex design, such as by providing two plates below to the right and left. Additionally, a chamber or hole may be provided in a plate, such as to make room for the stylus. Moreover, it may be possible to use another mechanical component instead of the plate, such as by using the stylus module that carries the chip as the bottom plate (shown in FIG. 2). When the stylus module is used also as the plate on the bottom, a simple plate can still be used on the top of the chip stack. Also, when the stylus module is used as the plate on the bottom, the (top) part of the stylus module used is still planar. In the example of FIG. 2, spacers are integrated into the stylus module so that no glass spheres need be used in the connection between the chip and stylus module.

In FIG. 3a, when the contact of the stylus 301 is impacted by a workpiece, deflection of the sensor that includes the movable portion 340 is first absorbed by the movable portion 340 moving within the movable range. The measurement method of the sensor described herein may be conventional in that 4 piezo resistive strain gauges can be deposited on each elastic element (slender rod/beam). These resistive strain gauges can be connected using aluminum tracks on deposited silicon to form the Wheatstone bridge configuration. A deformation of the beam results in a deformation of the strain gauges, which changes resistance as a result. This change in resistance is measured (as a voltage over the Wheatstone bridge).

In the design of the sensor according to the present disclosure, the slender rods and central platform can be made from a single silicon wafer in a series of etching and deposition steps. A silicon wafer can be used as silicon-on-insulator wafer made of a silicon layer on top of a silicon-oxide layer on top of a silicon layer. The layers are bonded to form a single piece. It may be possible to alternatively manufacture a sensor from a pure silicon wafer. In any case, strain gauges and electrical tracks are deposited on the silicon piece.

The movable portion 340 is second able to moving together with the sensor until stopped by a mechanical stop (shown as the top horizontal section in FIG. 3a). In this way, when the contact of the stylus 301 is impacted by the workpiece, deflection of the sensor that includes the movable portion 340 is second absorbed by the two parallel substantially planar plates on the sides and/or above and below moving together with the sensor until stopped by the mechanical stop. Deflection of the sensor is third absorbed by one (or both) kinematic joints #1 disengaging. In this way, when the contact of the stylus 301 is impacted by the workpiece, deflection of the sensor that includes the movable portion 340 is third absorbed by a first kinematic coupling 304b (two are shown, one labeled) disengaging a coupling of a contact probe (movable module 360) from a housing 302 that houses the contact probe, to thereby allow the contact probe (movable module 360) to break free of the housing 302. Furthermore, deflection of the sensor can be fourth absorbed by a kinematic joint #2 allowing the overall stylus module 300 to disengage from another object to which the stylus module 300 is attached. Alternatively, or additionally, when the contact of the stylus 301 is impacted by the workpiece, deflection of the sensor can be absorbed by deflection of the sensor that includes the movable portion 340 allowing a second kinematic coupling to disengage to thereby allow the stylus 301 to break free of the contact probe (movable module 360).

In the progressive views of FIGS. 3a, 3b, 3c and 3d, outer elements are stripped away so as to more clearly show the inner elements of the exemplary stylus module 300 of the exemplary tactile probing system. In FIG. 3b, a movable module 360 is separated from the chip module housing 302. In separating from the chip module housing 302, the kinematic joints #1 304b separate as shown. Additionally, the pressing force application-type conductive pins 350 are withdrawn from the movable module 360, though conductive pins which remain in contact with a chip can also be used.

Figure 1A:
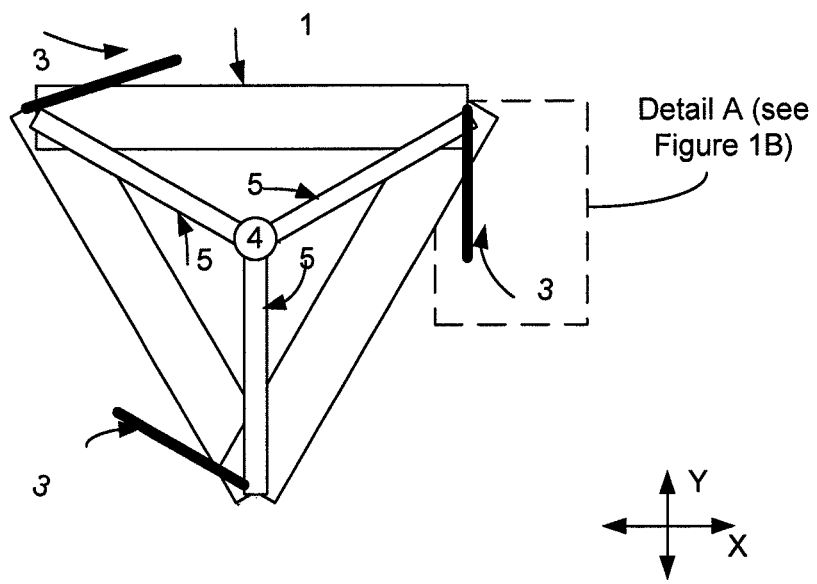
FIG. 1*a* shows elements of a conventional contact probe, according to an aspect of the present disclosure.
Figure 3C:
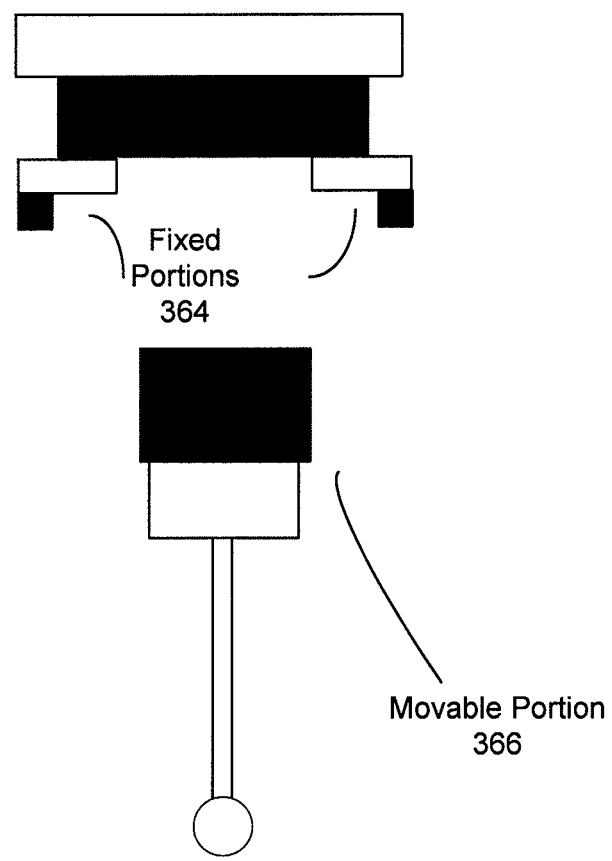
FIG. 3c shows elements of an exemplary tactile probing system, according to an aspect of the present disclosure.

In FIG. 3c, the movable module 360 is shown broken into fixed portions 364 and a movable portion 366. FIG. 3d includes FIG. 3d1a, FIG. 3d1b, FIG. 3d2a, FIG. 3d2b, FIG. 3d3, FIG. 3d4, FIG. 3d5, FIG. 3d6, and FIG. 3d7. FIG. 3d1a shows a side view of movable portion 366, thin-walled portions 330 and fixed portions 364 in one embodiment. FIG. 3d1b shows a side view of movable portion 366, thin-walled portions 330 and fixed portions 364 in another embodiment. In FIGS. 3d1a and 3d1b, sensing elements (sensors) 335 are shown on the thin-walled portions. In the embodiment of FIG. 3d1a, the thin-walled portions 330 are disposed between the fixed portions 364 and moveable portion 366 at or close to an off-center, upper (or lower) elevation, whereas in the embodiment of FIG. 3d1b the thin-walled portions 330 are disposed between the fixed portions 364 and moveable portion 366 at or close to a center, middle elevation. Sensing elements 335 are provided on the thin-walled portions 330 in each of FIGS. 3d1a and 3d1b.

FIGS. 3d2a and 3d2b show overhead views of the movable portion 366, thin-walled portions 330 and fixed portions 364 in additional embodiments. As should be evident, the fixed portions 364 may be considered to sandwich the movable portion 366 when viewed from the side and from the top, and are thus considerable to be coplanar in one or both views in embodiments. In this sense, a top level of fixed portions 364 may be considered equal (planar) or substantially equal (substantially planar) with a top level of movable portion 366, and a bottom level of fixed portion 364 may be considered equal (planar) or substantially equal (substantially planar) with a bottom level of movable portion 366. The equal (planar) top and bottom levels of the fixed portions 364 and movable portion 366 may only be equal in default (resting positions), or may be maintained equal (planar) when the fixed portions 364 and movable portion 366 are moved together rigidly.

In FIG. 3d2a, the thin-walled portions are provided at multiple off-centered positions between the movable portion 366 and fixed portions 364. In FIG. 3d2b, the thin-walled portions are provided at multiple centered positions between the movable portion 366 and fixed portions 364, FIG. 3d3 shows a configuration of a sensor, according to an aspect of the present disclosure. The sensor in FIG. 3d3 is used with the embodiments in, e.g., FIGS. 3d1a, 3d1b, 3d2a and 3d2b. FIG. 3d3 provides a detailed view, in which a (small) gap is shown between the outer edge (fixed portion) and center platform (moving member). This small gap can be used to protect the sensor against in-plane motions.

The center platform in FIG. 3d3 is connected to a chip support (fixed portion) via 3 slender rods. The rods are stiff in their length direction, but compliant when bending. In this way, the center platform moves freely in a vertical direction (out of the plane) and rotates around Rx and Ry.

Translations in X or Y directions, or a rotation around the z axis (Rz) requires the slender rods to be stretched (deformed) in their length direction (stiff). Thus, these motions require much higher forces. Also, the stresses in the slender rods become much higher when a specific displacement is forced upon the center platform. This may cause the rods to break, which is not desirable. Alternative embodiments shown in FIGS. 3d4, 3d5, 3d6 and 3d7 increase the compliance of the chip for in-plane motions, and are discussed below. These alternative designs feature a mechanical stop in the sensor plane, as well as slender rods (thin-walled portions) that are compliant in the sensor plane.

Figure 4:
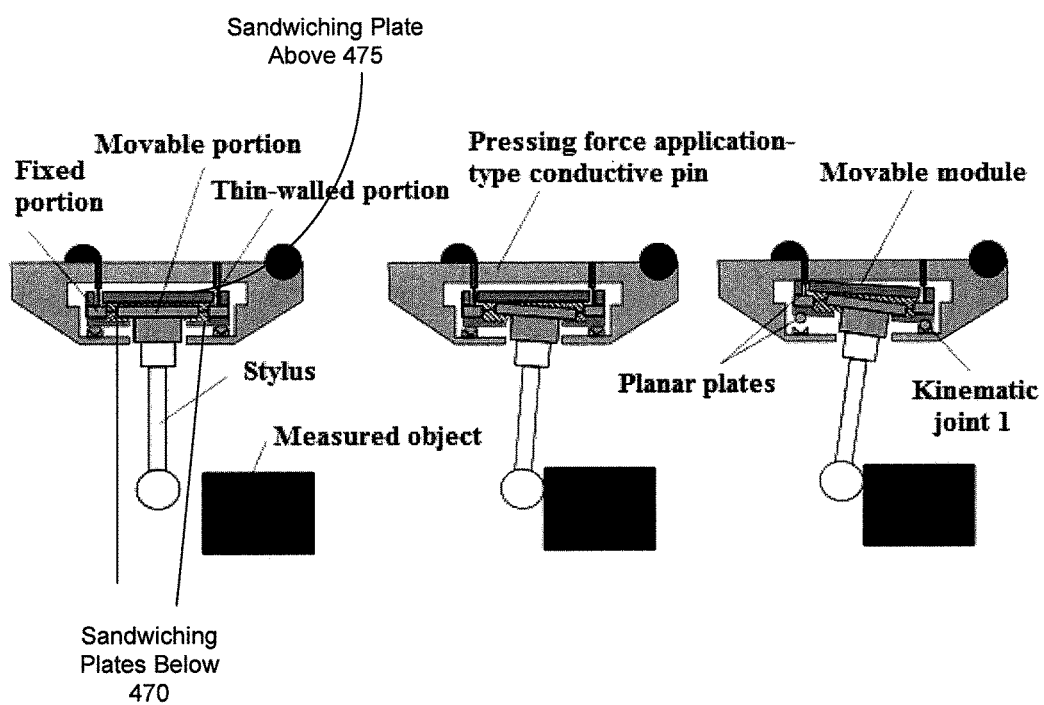

FIG. 3d4 shows a configuration of a sensor, according to an aspect of the present disclosure. In FIG. 3d4, the center platform (movable portion) is connected to the chip support (fixed portion) via 3 bended slender rods. Even though a single rod is stiff in its length direction, the addition of a second rod (connected to the first rod, creating a bended slender rod) make the system (bended slender rod) also compliant in the length direction of the rod. In this way, the center platform is free to move in any direction (within limits of course). The trench (channel) between the center platform and the chip support (outer edge) is made very narrow (for example 50 micrometers). The more compliant bended rods should allow a motion of the center platform of at least this amount (50 micrometers) before breaking. In this way, the trench (channel) functions as a mechanical stop, and protects the fragile slender rods against fracture when moving the central platform in the XY-plane.

Figure 5:
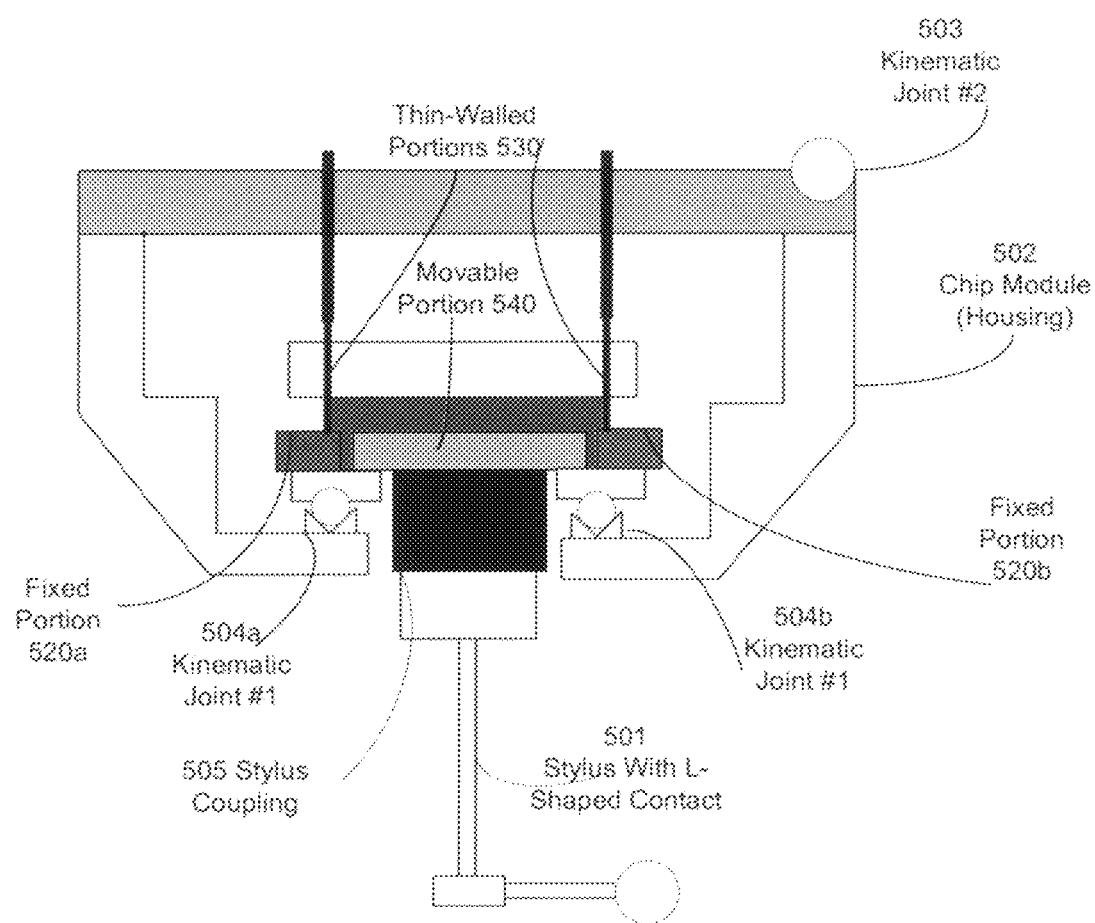

FIG. 3d5 shows a configuration of a sensor, according to an aspect of the present disclosure. In this alternative embodiment of FIG. 3d5, the difference from FIG. 3d3 is that the center platform is modified to make the slender rods (in combination with the center platform) more compliant in the length direction of the slender rods, so as to allow a (small) motion in the length direction of the slender rods (XY-translation and Rz rotation).

Figure 6:
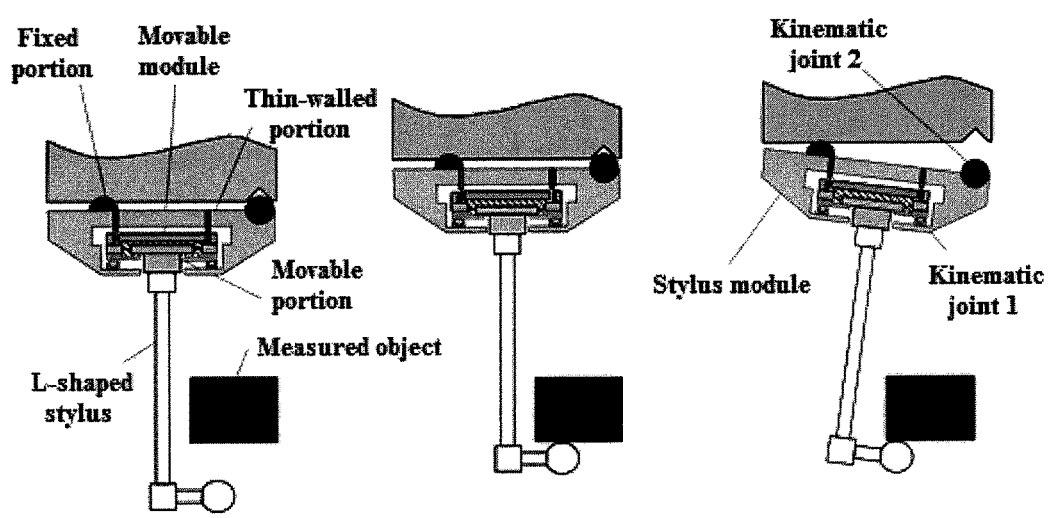

FIG. 3d6 shows a configuration of a sensor, according to an aspect of the present disclosure. Same as compliant chip 1 or compliant chip 2, with the difference that the center platform is modified have a separate mechanical stop, in a different part of the chip than the slender rods. The mechanical stop in this design can be optimized for the expected forces to occur. Also, damage to the rods can be prevented by using a wider trench around the rods, to assure that the structure surrounding the rods (or the rods themselves) do not contact the chip support structure (outer edge) or the central platform.

Figure 7:
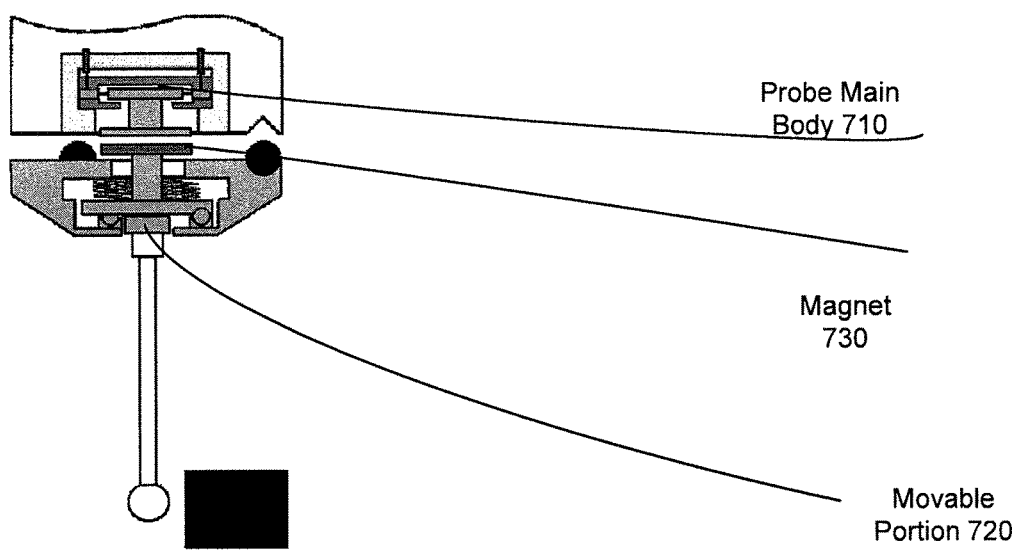

FIG. 3d7 shows a configuration of a sensor, according to an aspect of the present disclosure. The embodiment of FIG. 3d7 includes curved slender rods (thin-walled portions) that offer improved compliance in all directions.

Figure 1C:
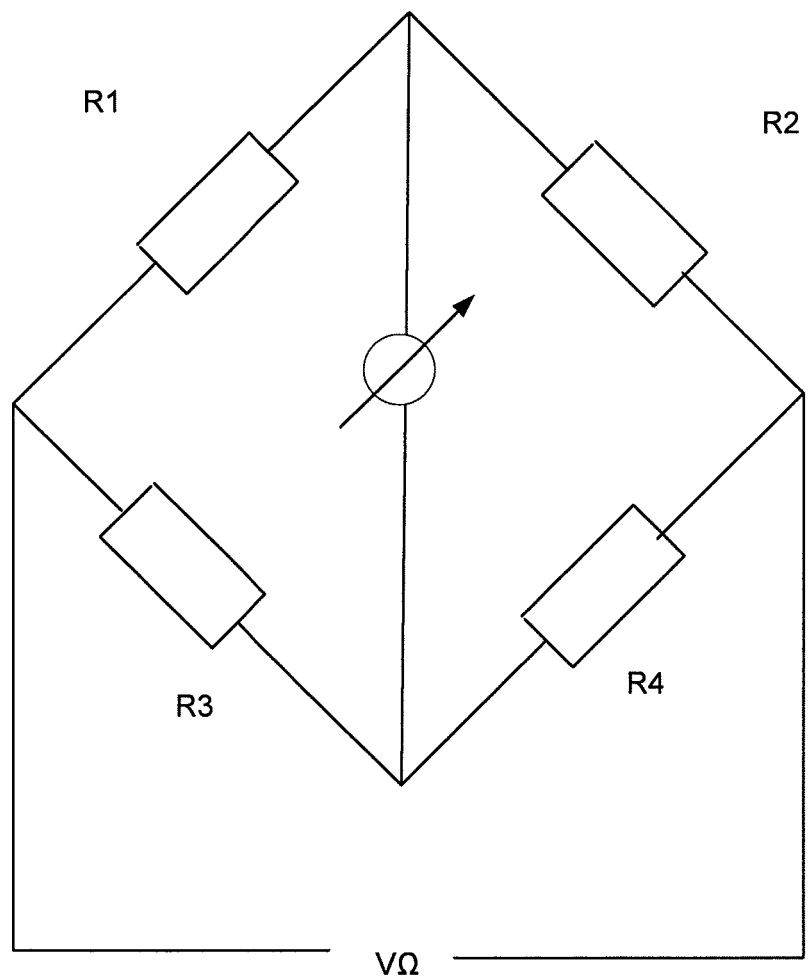
FIG. 1*c* shows elements of the conventional contact probe, according to an aspect of the present disclosure.
Figure 1D:
FIG. 1*d* shows elements of the conventional contact probe, according to an aspect of the present disclosure.

FIG. 3e1 shows an exemplary tactile probing system, according to an aspect of the present disclosure. In FIG. 3e1, an alternative configuration of the probe is shown, where the electrical connection between sensor and holder is made using conductive wires. Additionally, in FIG. 3e1, the preload force between the movable module and probe module (holder), via the kinematic mount, is created separately by a preloaded spring.

FIG. 3e1, as well as FIGS. 3e2, 3e3 and 3e4 described below, are alternatives to the embodiment of FIG. 3a, and show different possible configurations for a probe of this type. In FIG. 3e1, the electrical connection with the sensor does not require the use of (spring-loaded) conducting pins, and the preload force can be applied separately from the electrical connection with the sensor, for example using a preload spring as shown. In FIG. 3e1, a single preload spring is used, but it should be recognized that multiple springs can be used as well. Additionally, the force may be applied via an intermediate body, for example a lever, to provide a distributed force on several positions on the movable module.

FIG. 3e2 shows another exemplary tactile probing system, according to an aspect of the present disclosure. In FIG. 3e2, the electrical connection with the sensor is made using VIAs (vertical interconnect access). These can be conventional vertical interconnect access, or TSVs (through silicon VIA). The vertical interconnect access can be manufactured into the planar plate that is used in the sandwich construction. The vertical interconnect access connect on one side to the (silicon) sensor chip and provide an electrical connection point to the probe main body, for example using electrical wires, a flex cable or another type of electrical connection.

FIG. 3e3 shows an exemplary tactile probing system, according to an aspect of the present disclosure. In FIG. 3e3 a design of the probe is shown where the movable module has a (membrane type) spring on its sides. This situation is also described below with respect to the description of FIGS. 8a and 8b. The (membrane type) spring can be manufactured as part of the sensor, one of the planar plates, for example a flex-rigid PCB (printed circuit board), or can be a separate component, for example a flex-cable.

In any case, the (membrane type) spring in FIG. 3e3 offers a preload force on the kinematic coupling between the movable module and the probe housing. The (membrane type) spring can also provide an electrical connection to the probe housing or probe main body, as shown in 3e4 and described below.

FIG. 3e4 shows an exemplary tactile probing system, according to an aspect of the present disclosure. In FIG. 3e4, the movable module has a (membrane type) spring on its sides, similar to FIG. 3e3. In this case, the (membrane type) spring also provide an electrical connection to the probe housing or probe main body. In FIG. 3e4, spring loaded contact pins are shown that provide the electrical connection, but other connections are possible as well.

If spring loaded contact pins are used, these can also be used to clamp the movable module on the probe housing, as shown in FIG. 3e4. Otherwise a different mechanical connection may be required to fix the moveable module (via the membrane type spring) to the probe housing. An alternative mechanical connection may be, for example, glue.

Also, in FIG. 3e4, the movable module is suspended in the (membrane type) springs and is not supported by a kinematic coupling. In this case, the stiffness of the (membrane type) springs will influence the measurement sensitivity, as is already discussed with FIGS. 8a and 8b.

Therefore, in the various embodiments shown in FIGS. 3a, 3b, 3c, 3d1a, 3d1b, 3d2a, 3d2b, 3d3, 3d4, 3d5, 3d6, 3d7, 3e1, 3e2, 3e3 and 3e4, a movable portion 366 may be allowed to move laterally between fixed portions 364. As described elsewhere, a movable portion 366 of a movable module may also be allowed to move vertically between upper and lower fixed portions. In this way, displacements of the movable portion 366 of the movable module in multiple dimensions can be measured.

Space for the movable portion 366 to move is provided between the movable portion 366 and the fixed portions 364, and thin-walled portions 330 are provided between the movable portion 366 and the fixed portions 364. As should be evident from the beginning sections of this disclosure, the thin-walled portions 330 include the elements that detect displacements when the stylus with contact 301 contacts a workpiece.

FIG. 4 illustrates the behavior of movable portions when the stylus with contact 301 makes contact with a measured object. In a state of no contact, the planar movable portion is in a state separated from the two parallel plates that are the fixed portions (left drawing). When the stylus with contact makes contact with the measured object, the planar movable portion begins to change orientation, until finally making contact with sandwiching plates above 475 and sandwiching plate below 470 within the range of movement, and movement is constrained. This is the so-called "measurement range." When the force resultant from the contact is made stronger, the movable body portion lifts up the two thin-walled plates of the sandwiching plates above 475 and sandwiching plate below 470, and the entire movable module moves away from the left kinematic joint #1. As noted above, since this occurs within the elastic range of the thin-walled portions, the sensor is not broken and a millimeter-order overshot is enabled.

Movable portion of the tactile probing system is sandwiched between fixed portions substantially in parallel so as to maintain a predetermined distance therebetween. Each movable portion is movable within a limited movable range. A sensor such as chip 306 has a substantially planar shape, and includes a fixed portion mounted to a movable portion.

Figure 9:
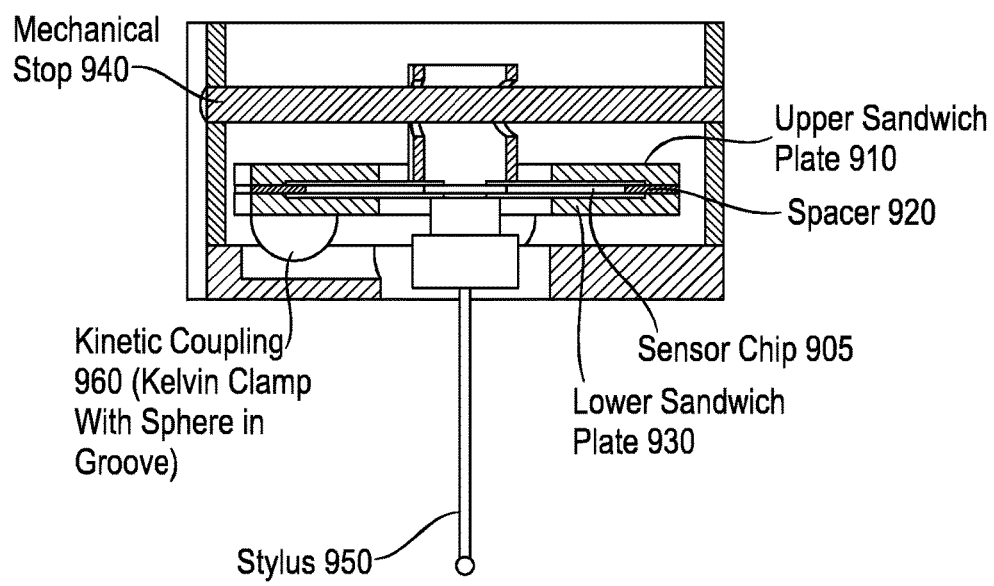
FIG. 9 shows another exemplary tactile probing system, according to an aspect of the present disclosure.

FIG. 9 shows another view of the tactile probing system described herein, wherein a sensor chip 905 is sandwiched between an upper sandwich plate 910 and a lower sandwich plate 930. The sensor chip 905 has a substantially planar shape, and includes the fixed portion mounted to a movable portion. The upper sandwich plate 910 and lower sandwich plate 930 are two parallel substantially planar plates connected in front and behind the fixed portion of the sensor chip 905. Thin-walled portions are each formed by one planar plate and link the movable portion and the fixed portion in at least three locations. A strain sensor is vapor-deposited on the thin-walled portions. The sensor chip 905 outputs a contact signal due to the strain sensor deforming in response to a measurement force from the stylus.

In FIG. 9, the upper sandwich plate 910 and lower sandwich plate 930 are shown to the left and right of the central portion in which the stylus 950 is centered. However, the upper sandwich plate 910 and lower sandwich plate 930 may each be continuous plates provided in a circular pattern or other pattern around the central portion in which the stylus 950 is centered. Outer edges and inner edges of the upper sandwich plate 910 and lower sandwich plate 930 may be substantially symmetrical in a default state or even when the plates are moved together.

In FIG. 9, the tactile probing system is shown where the sensor chip 905, the upper sandwich plate 910 and the lower sandwich plate 930 configure a movable module. The movable module in FIG. 9 configures a kinematic joint (six-point seating mechanism) with a probe casing, and is seated on a probe module by a spring member connecting the probe module and the movable module. When the movable range is exceeded, the movable module moves away from the six-point seating mechanism and the entire movable module displaces. Alternatively, however, a kinematic joint may be configured between the movable module and the stylus itself, rather than a probe casing.

As noted, in FIG. 9 the probe module configures a six-point seating mechanism (kinematic joint) 960. The six-point seating mechanism may also constitute an electric conductor between the probe module and a probe main body, and perform a role of conveying the contact signal from the strain sensor to the probe main body.

In FIG. 9, the upper and lower sandwich plates 910, 930 may be connected in front and behind to the fixed portion of the sensor. Further, spheres having substantially identical diameters (not shown in FIG. 9) may be used to provide a gap between the substantially planar plates and the sensor. Other spacers that can be used include spheres in glue, such as glass spheres, as well as a spacer that is removed after curing the glue, a spacer made to fit such as a membrane cutout, or a spacer that is manufactured as part of a sandwich plate.

This can also be applied to cases shown in FIGS. 5 and 6 where, for example, an L-shaped stylus 501 or a star stylus (five-direction stylus) are attached by a stylus change. In other words, in a case where a −Z-direction measurement force is applied to the stylus 501, the movable module is pulled downward. In such a case, the movable portion 540 makes contact with a planar plate installed below the stylus module and prevents deformation of the thin-walled portion. Ultimately, the kinematic joint #2 is actuated by the measurement force from the measured object, displacing the entire stylus module when the measurement force becomes large enough. The sequence in which forces pull a stylus down (or up) is shown in FIG. 6, where the kinematic joint #2 is shown to break so as to allow the stylus module to separate with the movable module and stylus.

Another tactile probing system is shown in FIG. 7, wherein a movable portion 740 includes the sensor, and can be provided with the movable module as a whole, so as to be installed to the probe main body 710 and be shared. When the stylus module is seated on the probe main body 710, the movable portion 720 is connected to the stylus of the stylus module, and use of a permanent magnet 730 is one such method that can be employed. In this case, there is no further need to think of a method for electronic transmission of an output signal from the sensor to the probe main body 710 and the structure is simplified.

Figure 8A:
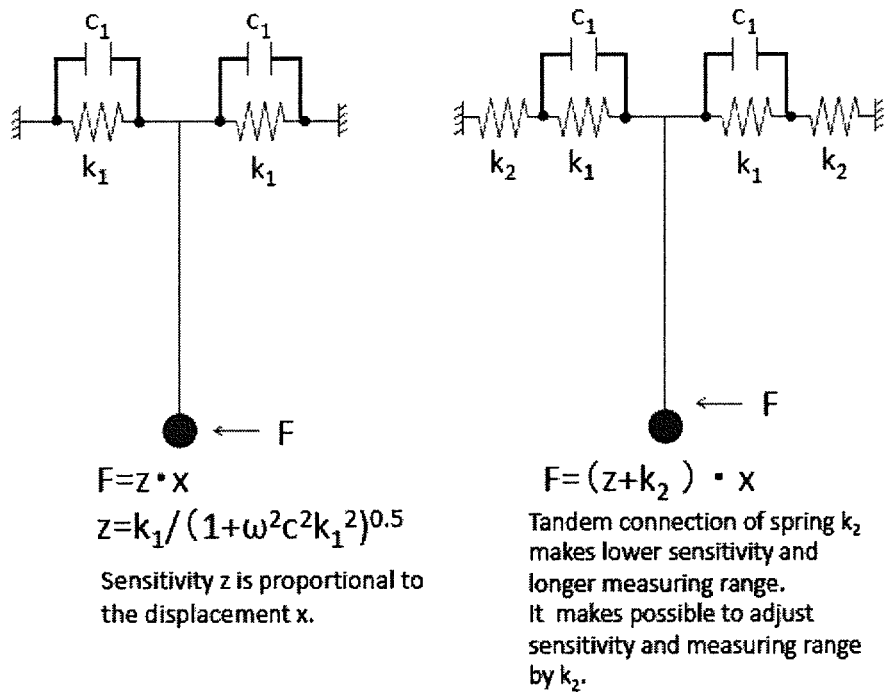
FIG. 8a shows elements of an exemplary tactile probing system, according to an aspect of the present disclosure.

FIG. 8a shows additional views of elements in a tactile probing system. In FIG. 8a, x represents displacement, z represents sensitivity and k represents the spring rate, which is a constant that depends on the base material and construction characteristics of a spring. Sensitivity z is proportional to displacement x. The force F is measured between two springs, where in the left drawing two springs are each in parallel with a respective capacitor, and in the right drawing two springs are each in parallel with a respective capacitor but two additional springs are provided as shown. In the drawing on the right, the additional springs are labeled $k_2$, whereas the first two springs in each drawing are labeled $k_1$. Tandem connection of spring $k_2$ in the right drawing in FIG. 8a allows for lower sensitivity and a longer measuring range. This makes it possible to adjust sensitivity and measuring range by $k_2$. In the drawing on the left, sensitivity is proportional to displacement.

Figure 8B:
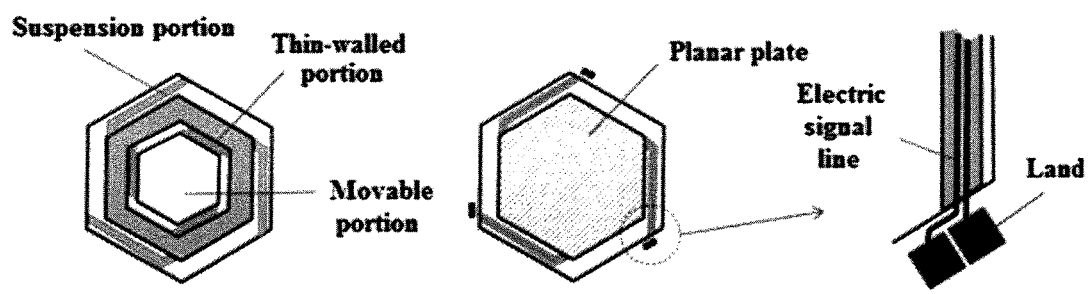
FIG. 8b shows elements of an exemplary tactile probing system, according to an aspect of the present disclosure.

FIG. 8b shows additional views of elements in a tactile probing system. In this regard, a point emphasized by the present disclosure is to not break. When attention is focused on not breaking, it becomes evident that a plate having a desired spring rate can be used instead of a friction type kinematic joint. Such a plate having a desired spring rate can be provided to an exterior. A plate spring movable range on the exterior can then incorporate a measurement range on an interior. In FIG. 8b, labeled elements include a suspension portion, a thin-walled portion a movable portion, a planar plate, an electric signal line, and land. The context for each element is shown in the sequence of FIG. 8b As disclosed herein, a probing system includes a variety of mechanisms to avoid breaking. One such mechanism is a kinematic joint (friction type), though a plate having a desired spring rate can instead be provided to an exterior. A plate spring can also be provided so as to allow movement within a movable range.

The range of elastic deformation of the thin-walled portion within the movable module is inherently extremely small, a few tens of micrometers. Because suspension portions on the exterior side are connected in series, it becomes possible to broaden the range of elastic alteration (i.e., measurement range) by defining the spring rate of the thin-walled portion and the suspension portion (although sensor resolution deteriorates proportionately), which is the greatest advantage of the present invention.

Accordingly, the present disclosure relates to a 3D probing system for coordinate-measuring machines (CCMs)

together with a measuring method suitable for calibrating this 3D probing system. The probing system may include a probe which is elastically suspended on a probe housing using elastic elements which all lie in the same plane. The displacement of the probe is measured using a measuring system based on strain gauges which are mounted directly on the elastic elements. The bridge and the measuring system can be manufactured by integrating them into a series of lithography and etching steps, or can be manufactured separately and subsequently assembled. The probing system is suitable for carrying out precision measurements. The probing system described herein may be implemented with a resolution in three orthogonal directions of less than 20 nanometers. The dynamic and static measurement force can also be limited to a few millinewtons in normal use. Further, a measuring method is described which makes it possible to calibrate the probing system in three directions with nanometer precision in order to calibrate this probing system.

Although the tactile probing system has been described with reference to several exemplary embodiments, it is understood that the words that have been used are words of description and illustration, rather than words of limitation. Changes may be made within the purview of the appended claims, as presently stated and as amended, without departing from the scope and spirit of the tactile probing system in its aspects. Although the tactile probing system has been described with reference to particular means, materials and embodiments, the tactile probing system is not intended to be limited to the particulars disclosed; rather the tactile probing system extends to all functionally equivalent structures, methods, and uses such as are within the scope of the appended claims.

Although the present specification may describe components and functions that may be implemented in particular embodiments with reference to particular standards and protocols, the disclosure is not limited to such standards and protocols. Such standards are periodically superseded by re efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The tactile probing system described herein makes it possible to allow overshoot more than the previous limit of a few micrometers to tens of micrometers. The tactile probing system resolves previous problems resulting from plastic deformation and breakage, which were issues shared by coordinate measuring machine collision low-force probes (including UMAP), and as a result tolerable overshoot has been drastically increased to a few millimeters.

In the embodiments disclosed herein, attachment/detachment of the stylus is possible using a kinematic joint such as six-point seating.

According to an aspect of the present disclosure, a contact probe includes a stylus having a contact; and a sensor having a substantially planar shape and including a fixed portion and a movable portion to which the stylus is mounted. The movable portion is linked to the fixed portion in at least three locations via thin-walled portions that are each formed by one planar plate and that each have a strain sensor vapor-deposited thereon. The sensor outputs a contact signal due to the strain sensors deforming in response to a measurement force from the stylus. Two parallel substantially planar plates are connected to the fixed portion on opposing sides. The movable portion is sandwiched by the two parallel substantially planar plates so as to maintain a predetermined distance between the movable portion and the two parallel substantially planar plates, and movement of the movable portion is limited to a movable range.

According to another aspect of the present disclosure, the sensor and the two substantially planar plates configure a movable module. The movable module configures a kinematic joint between the movable module and a probe module, and is seated on the probe module by a spring member connecting the probe module and the movable module. When attempting to exceed the movable range, the movable module moves away from the kinematic joint and the entire movable module displaces.

According to yet another aspect of the present disclosure, the kinematic joint comprises a six-point seating mechanism.

According to still another aspect of the present disclosure, the probe module configures the six-point seating mechanism of an electric conductor between the probe module and a probe main body, and performs a role of conveying the contact signal from the strain sensor to the probe main body.

According to another aspect of the present disclosure, when the two substantially planar plates are connected in front and behind to the fixed portion of the sensor, a spacer is used to provide a gap between the substantially planar plates and the sensor. As described herein, however, other types of spacers may also be used to provide a gap between the planar plates and the sensor.

According to yet another aspect of the present disclosure, when the contact of the stylus is impacted by a workpiece, deflection of the sensor is first absorbed by the movable portion moving within the movable range.

According to still another aspect of the present disclosure, when the contact of the stylus is impacted by the workpiece, deflection of the sensor is second absorbed by the two parallel substantially planar plates moving together with the sensor until stopped by a mechanical stop.

According to another aspect of the present disclosure, when the contact of the stylus is impacted by the workpiece, deflection of the sensor is third absorbed by a first kinematic coupling that couples the contact probe to a housing that houses the contact probe disengaging to thereby allow the contact probe to break free of the housing.

According to yet another aspect of the present disclosure, when the contact of the stylus is impacted by the workpiece, deflection of the sensor is fourth absorbed by a second kinematic coupling that couples the stylus to the contact probe disengaging to thereby allow the stylus to break free of the contact probe.

According to still another aspect of the present disclosure, a predetermined distance between the movable portion and the fixed portion is kept and limits the movement of the movable portion in the sensor plane to a second movable range at three locations.

According to another aspect of the present disclosure, the thin-walled portions are configured to allow movement of the movable portion in the plane of the sensor.

According to yet another aspect of the present disclosure, the thin-walled portions are configured to allow movement of the movable portion in at least the second movable range.

Therefore, as described herein, a range of elastic deformation of thin-walled portion within the movable module can be maintained to within a few tens of micrometers. It is possible to broaden the range of elastic alteration (i.e., measurement range) by defining the spring rate of the thin-walled portion and the suspension portion (although sensor resolution deteriorates proportionately) insofar suspension portions on the exterior side are connected in series. However, as described herein, a series or combination of features can be used to progressively tolerate excessive displacement when a probe tip contacts a workpiece.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A contact probe, comprising:
   a stylus having a contact;
   a sensor having a substantially planar shape and including a fixed portion, at least three thin-walled portions each formed of a planar plate and having a strain sensor vapor-deposited thereon, and a movable portion to which the stylus is mounted and linked to the fixed portion via the thin-walled portions in at least three locations, and
   two parallel substantially planar plates connected to the fixed portion on opposing sides and sandwiching the movable portion so as to maintain a predetermined distance between the movable portion and the two parallel substantially planar plates and limiting movement of the movable portion to a first movable range,
   wherein the sensor outputs a contact signal due to the strain sensors deforming in response to a measurement force from the stylus.

2. The contact probe of claim 1,
   wherein the sensor and the two parallel substantially planar plates configure a movable module,
   wherein the movable module configures a kinematic joint between the movable module and a probe module, and is seated on the probe module by a spring member connecting the probe module and the movable module, and
   when attempting to exceed the first movable range or a second movable range the movable module moves away from the kinematic joint and the entire movable module displaces.

3. The contact probe of claim 2,
   wherein the kinematic joint comprises a six-point seating mechanism.

4. The A contact probe according to claim 3,
   wherein the probe module configures the six-point seating mechanism of an electric conductor between the probe module and a probe main body, and performs a role of conveying the contact signal from the strain sensor to the probe main body.

5. The contact probe of claim 1,
   wherein, when the two substantially planar plates according to claim 1 are connected in front and behind to the fixed portion of the sensor, a spacer is used to provide a gap between the substantially planar plates and the sensor.

6. The contact probe of claim 1,
   wherein when the contact of the stylus is impacted by a workpiece, deflection of the sensor is first absorbed by the movable portion moving within the first movable range or a second movable range.

7. The contact probe of claim 6,
   wherein when the contact of the stylus is impacted by the workpiece, deflection of the sensor is second absorbed by the two parallel substantially planar plates moving together with the sensor until stopped by a mechanical stop.

8. The contact probe of claim 7,
   wherein when the contact of the stylus is impacted by the workpiece, deflection of the sensor is third absorbed by a first kinematic coupling that couples the contact probe to a housing that houses the contact probe disengaging to thereby allow the contact probe to break free of the housing.

9. The contact probe of claim 8,
   wherein when the contact of the stylus is impacted by the workpiece, deflection of the sensor is fourth absorbed by a second kinematic coupling that couples the stylus to the contact probe disengaging to thereby allow the stylus to break free of the contact probe.

10. The contact probe of claim 1,
    wherein when the contact of the stylus is impacted by the workpiece, deflection of the sensor is absorbed by a kinematic coupling that couples the stylus to the contact probe disengaging to thereby allow the stylus to break free of the contact probe.

11. The contact probe of claim 1,
wherein a predetermined distance between the movable portion and the fixed portion is kept and limits the movement of the movable portion in the sensor plane to a second movable range at three locations.

12. The contact probe of claim 11,
wherein the thin-walled portions are configured to allow movement of the movable portion in the plane of the sensor.

13. The contact probe of claim 12,
wherein the thin-walled portions are configured to allow movement of the movable portion in at least the second movable range.

* * * * *